Oct. 20, 1959     H. DAVIES     2,909,032

TEMPERATURE COMPENSATING NOZZLE

Filed Oct. 24, 1956

Inventor:
Harold Davies
By Dudley B. Howard
Attorney

United States Patent Office 2,909,032
Patented Oct. 20, 1959

2,909,032
TEMPERATURE COMPENSATING NOZZLE

Harold Davies, Dover, N.J., assignor, by mesne assignments, to Thiokol Chemical Corporation, a corporation of Delaware Application October 24, 1956, Serial No. 618,084

1 Claim. (Cl. 60—35.6)

The invention relates in general to propulsion means for aerial vehicles, and has particular reference to those devices in this category that burn solid propellants, including rocket motors and other built-in propulsion means for the continuous airborne operation of rocket vehicle, missiles and projectiles as well as those of the auxiliary type, such as jet assist take off units, sometimes employed to launch self-propelled aircraft when runways of suitable length are not available.

A disadvantage of the use of some solid propellants is the effect of variation in ambient temperature on the burning rate. At high temperatures, many solid propellants will burn faster than at lower temperatures. This means that, in the use of a conventional exhaust nozzle having an orifice of fixed cross-sectional area, the rate of acceleration of a vehicle operated by such a propulsion device will depend upon the ambient temperature prevailing at the time of launching. Such an effect is highly undesirable because, in the successive launchings of rockets and similar vehicles for many purposes it becomes desirable that acceleration shall be at a constant rate for equal ballistic performances.

It therefore is the primary object of my present invention to provide means responsive to changes in ambient temperature to compensate automatically therefor by controlling the effective orifice area of the exhaust nozzle of the propulsion device in a manner to insure a constant propellant burning rate regardless of ambient temperature variations.

A further object is to provide temperature compensating means for the nozzle that will be rendered inoperative after the vehicle is in motion.

Figure 1:
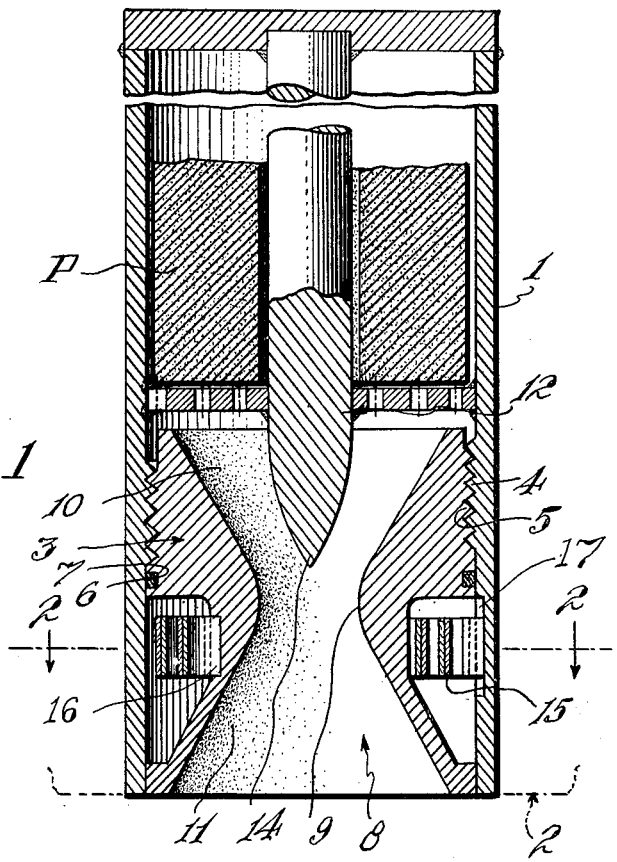
Figure 2:
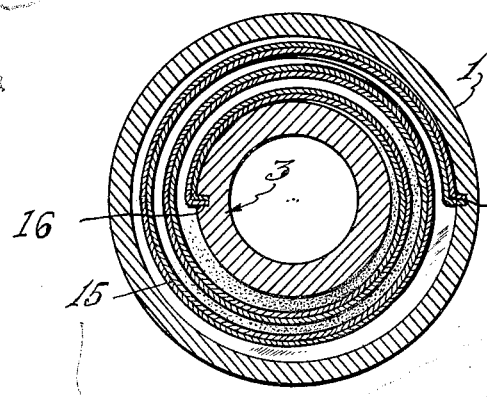

Other objects, advantages and features of the invention will become apparent as the following specific description is read in connection with the accompanying drawings, in which:

Figure 1 is a longitudinal section of a rocket nozzle constructed in accordance with the invention; and Figure 2 is a transverse section on line 2—2 of Figure 1.

Referring now in detail to the drawings, wherein like reference characters designate corresponding parts in the several views, the invention is illustrated as being incorporated in the self-contained propulsion means of a rocket, but it is to be understood that it is within the spirit of the invention and scope of the appended claim to apply the principle thereof to propulsion means for various other vehicles.

In the illustrative example, the numeral 1 designates the shell or liner of the cylindrical combustion chamber 2 of the rocket. A nozzle 3 is mounted in the outer end of shell or liner 1. This nozzle 3 has the conventional convergent-divergent orifice, but, instead of being fixed in position as heretofore, said nozzle is attached to liner 1 by loosely fitting screw threads 4 and 5 on the liner and the nozzle, respectively. These screw threads permit rotation of nozzle 3 in liner 1 under the influence of a thermostatic compensating element, which will be described in detail presently, to cause axial adjustment of said nozzle.

Although the screw threads 4—5 act as a labyrinth to retard gas escape, I have provided a positive gas seal by the employment of a sealing ring 6 of suitable material, which is set in groove 7 in the periphery of nozzle 3 at a location outwardly adjacent to the screwthreaded portion thereof.

The orifice 8 of nozzle 3 is medially constricted as at 9 and has oppositely flared inner and outer portions 10 and 11, respectively. This orifice structure is not new, nor is that of the outwardly extending pintle 12, which is fixedly supported at the axis of liner 1 in a position wherein its tapered free extremity 14 projects into inner portion 10 of the orifice. Pintle 12 usually is composed of graphite or similar material and penetrates the bore of the tubular solid propellant charge P whose products of combustion issue through orifice 8 of nozzle 3 to propel the rocket.

In order that nozzle 3 may be adjusted axially within liner 1 to cause pintle 12 to penetrate orifice portion 10 in varying degrees and thereby change the effective area of orifice 8 in a manner to compensate for variations in ambient temperature, I have located a bi-metallic thermostatic element 15 in the recessed outer periphery of nozzle 3. Thermostatic element 15 is in the form of a flat coil and has its radially inbent inner end fixedly anchored in closely fitting socket 16 in nozzle 3. To prevent undesired axial distortion of thermostatic element 15 during screw adjustment of nozzle 3, the outer outbent end of said element is fitted slidably in a longitudinal key slot 17 provided in the inner periphery of liner 1.

The composition of thermostatic element 15, the pitch of screw thread 4—5, and the relative form characteristics of pintle 12 and nozzle orifice 8 all should be such that complete compensation of the effective orifice area for changes in ambient temperature will be achieved to insure a constant propellant burning rate and resulting constant degree of propulsive thrust. Thermostatic element 15 can be in any form provided that the desired temperature-rotation characteristics are maintained. However, by the use of a non-linear element, compensation can follow a non-linear chamber pressure-ambient temperature curve.

Although the matching taper of fixed pintle 12 and orifice portion 10 shown in the drawings has been found to be desirable in practice, it is to be understood that other structural forms may be adopted provided that the temperature-rotation characteristics are not disturbed.

The operation of my temperature compensating nozzle in its presently contemplated use with a solid propellant that burns at a faster rate at low ambient temperatures than when the temperature rises will now be described.

Assuming that screw threads 4—5 are right-handed, nozzle 3 will be rotated in clockwise direction (Figure 2) when the ambient temperature drops, thereby translating said nozzle upward (Figure 1) to cause deeper penetration of fixed pintle 12 into upper orifice portion 10. The desired result of this operation is to reduce the effective area of orifice 8 and thus increase the burning rate of propellant charge P. Conversely, if the temperature rises, nozzle 3 will be rotated in the opposite direction to decrease the penetration of pintle 12 into orifice portion 10 and thereby increase the effective area of the orifice to compensate for the reduced burning rate which otherwise would occur.

Under predictable reverse conditions, should a propellant be used that burns at a slower rate when the ambient temperature rises, all that is required to accommodate the presently illustrated embodiment of my temperature compensating means to the substituted propellant is to invert thermostatic element 15. The effect of this rearrangement will be to screw nozzle 3 upward instead of downward when the ambient temperature rises, so as to decrease the effective area of orifice 8 and thus compensate for the changes in the burning rate.

While screw threads 4—5 fit together with sufficient looseness to permit free rotation of nozzle 3 in liner 1 under static conditions, the nozzle will be checked against rotation during firing of the rocket, or other vehicle, due to the high frictional force produced by chamber pressure.

While there have been shown and described and pointed out the fundamental novel features of this invention as applied to a single structural embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claim.

I claim:

A temperature compensating nozzle assembly for rocket-type propulsion devices comprising: a hollow cylindrical combustion chamber element having an open exhaust end; a solid propellant charge which normally burns at different rates depending upon the ambient temperature confined in the combustion chamber element; a nozzle element rotatable in the open exhaust end portion of the combustion chamber element and having screw-threaded connection therewith, whereby rotation of said nozzle element will cause axial adjustment thereof in said chamber element, said nozzle element having an axial orifice; a pintle fixedly supported within the combustion chamber element in axial alignment with the nozzle element orifice, said pintle and nozzle element orifice being so constructed and arranged cooperatively that axial adjustment of the nozzle element in opposite directions will alternately increase and decrease the effective area of the nozzle element orifice to control the rate of exhaust of combustion gases; and means responsive to variations in ambient temperature to rotate the nozzle element in one direction when the temperature rises and in the opposite direction when the temperature drops and thereby maintain a constant propellant burning rate, said temperature responsive means including a thermostatic element in the form of a bi-metallic strip comprising a flat coil having its respective inner and outer ends bent respectively radially inward and outward in co-planar relation to each other and to the coil as a whole, one element of the nozzle-chamber elements combination being provided with a radial socket and the other element thereof having an axial key slot, the construction and arrangement of the thermostatic element being such that it may be arranged alternatively in a plane perpendicular to the combustion chamber element axis and substantially concentric thereto in either of two selected axially inverted positions during assembly with one end of the bi-metallic coil fixedly engaged in the socket of one element of the chamber-nozzle elements combustion and the other end slidably fitting the key slot of the other element of said combination, whereby the direction of rotation of the nozzle element may be reversed to accommodate for opposite burning characteristics of the propellant under variations in ambient temperature.

References Cited in the file of this patent
UNITED STATES PATENTS

| | | |
|---|---|---|
| 1,042,122 | Kocourek | Oct. 22, 1912 |
| 1,806,530 | Giesler | May 19, 1931 |
| 2,552,497 | Roach et al. | May 8, 1951 |
| 2,583,570 | Hickman | Jan. 29, 1952 |
| 2,612,747 | Skinner | Oct. 7, 1952 |
| 2,620,626 | Lysholm | Dec. 9, 1952 |